United States Patent [19]
Ostermeier et al.

[11] 3,949,127
[45] Apr. 6, 1976

[54] APERTURED NONWOVEN WEBS

[75] Inventors: Kurt W. Ostermeier, Menasha; Michael C. Josephs, Green Bay, both of Wis.

[73] Assignee: Kimberly-Clark Corporation, Neenah, Wis.

[22] Filed: May 14, 1973

[21] Appl. No.: 359,672

[52] U.S. Cl. ............ 428/137; 428/194; 428/198; 428/212; 428/229; 428/265; 428/296; 428/910
[51] Int. Cl.² .. B32B 3/10; B32B 27/02; D04H 1/54
[58] Field of Search ............ 161/109, 148, 150, 70, 161/72, 92, 402, 157, DIG. 6; 428/131, 137, 194, 198, 212, 221, 222, 225, 227, 229, 232, 236, 265, 296, 299, 302, 903, 910

[56] References Cited
UNITED STATES PATENTS

| | | | |
|---|---|---|---|
| 3,104,998 | 9/1963 | Gelpke | 161/109 |
| 3,510,389 | 5/1970 | Olson | 161/148 |
| 3,525,653 | 8/1970 | Manock | 161/150 X |
| 3,542,634 | 11/1970 | Such et al. | 161/109 X |
| 3,679,535 | 7/1972 | Kalwaites | 428/131 |
| 3,679,536 | 7/1972 | Kalwaites | 161/109 |
| 3,681,182 | 8/1972 | Kalwaites | 428/131 |
| 3,681,184 | 8/1972 | Kalwaites | 161/109 |
| 3,781,183 | 12/1973 | Doll | 161/109 |
| 3,855,045 | 12/1974 | Brock | 161/148 X |
| 3,855,046 | 12/1974 | Hansen et al. | 161/150 |

*Primary Examiner*—Harold Ansher
*Attorney, Agent, or Firm*—Wolfe, Hubbard, Leydig, Voit & Osann, Ltd.

[57] ABSTRACT

Webs having a desirable combination of strength and fabric-like characteristics can be prepared by ultrasonically induced fusion of a web of unbonded, molecularly oriented thermoplastic fibers at intermittent regions and in a manner such that the intensity of fusion in the individual intermittent regions diminishes from the center of the regions to their edges. On subsequently stretching, those areas of the regions which are most intensively fused break apart to form the perforations in the web.

8 Claims, No Drawings

APERTURED NONWOVEN WEBS

The present invention relates to the preparation of bonded nonwoven webs containing apertures through the thickness thereof. More particularly, it concerns the preparation of apertured webs from webs of molecularly oriented thermoplastic fibers, and especially from webs of substantially continuous and randomly deposited thermoplastic filaments.

Nonwoven webs comprising a plurality of substantially continuous and randomly deposited, molecularly oriented filaments of a thermoplastic polymer are now widely known. The following patents illustrate a variety of methods for preparing such webs and for bonding them into coherent structures. Kinney (U.S. Pat. Nos. 3,338,992 and 3,341,394), Levy (U.S. Pat. No. 3,276,944), Petersen (U.S. Pat. No. 3,502,538), Hartmann (U.S. Pat. Nos. 3,502,763 and 3,509,009), Dobo et al. (U.S. Pat. No. 3,542,615), Dorschner et al. (U.S. Pat. No. 3,692,618), Vosburgh (U.S. Pat. Nos. 3,459,627 and 3,368,934), Harmon (Canadian Pat. No. 803,714), and Cumbers (British Pat. No. 1,245,088).

Continuous filament webs formed in the above-described general manner are characterized by a typically fabric-like softness, hand, and drape, and thus appear to be quite suitable for many fabric applications where conventional woven fabrics or the like have been conventionally employed. However, as initially prepared, continuous filament webs are ordinarily very unstable, thus lacking adequate strength to permit their completely successful use in applications such as bed linens, garments, drapery materials, etc. Consequently, it is conventional practice to stabilize the continuous filament webs by bonding together the filaments contained therein either autogenously or by means of independently applied adhesives.

While known bonding techniques increase the stability of continuous filament webs, a problem exists in achieving such increased stability without adversely affecting other desirable web characteristics such as its fabric like drape, softness and feel. Web stabilization techniques involving overall web bonding wherein the filaments in the web are united at substantially all filament cross-over points generally produce a web which is harsh and stiff. While it is true that the initial stiff and harsh feel of overall bonded webs is frequently diminished when the web is actually used, presumably due to some bond breakage, such softening is generally accompanied by other undesirable features such as a reduction in surface abrasion resistance and an overall reduction in web strength and stability.

Other web stabilization techniques such as those which involve intermittent web bonding are also not completely satisfactory. The problem associated with stabilizing webs by means of intermittent bonding is to achieve an adequate level of bonding to obtain sufficient surface abrasion resistance and other desirable strength characteristics, and yet to preserve the fabric-like characteristics of the continuous filament web.

In particular, it has been difficult to obtain an intermittently bonded continuous filament web wherein the web is textile-like in drape, feel, and softness, has good surface abrasion resistance and has good strength characteristics particularly with respect to the web's capacity to absorb energy under strain. This latter characteristic of energy absorption is indicative of the ability of the web to deform without substantial filament fracture under strain. An increased capacity for absorbing energy is particularly important when the web is to be used in applications such as garments and sheets where, in use, the web will be constantly subjected to strains at localized areas such as the toe area in bed sheets and the elbow and knee areas in wearing apparel. In the absence of a good capacity for absorbing energy, the use of continuous filament webs in such applications is accompanied by significant web failure at those localized regions where strains are applied.

Copending Hansen and Pennings application, Ser. No. 177,077, filed Sept. 1, 1971 now U.S. Pat. No. 3,855,046, and copending Schwartz application, Ser. No. 359,673, filed on even date herewith and entitled "Stabilized Nonwoven Web and Method of Preparation" describe useful methods of preparing intermittently and autogenously bonded continuous filament webs which possess a desirable combination of textile like properties, abrasion resistance and strength. The method disclosed in the Hansen and Pennings application involves preheating a continuous filament web and thereafter passing it through a nip wherein one of the rolls contains raised points. By appropriately selecting the nip roll pressure and temperature, effective intermittent bonding of webs having a basis weight of less than about 1 oz./yd.$^2$ can be accomplished. The Schwartz application is principally concerned with intermittent bonding of higher basis weight webs and, in part, involves the elimination of the preheating step illustrated in Hansen and Pennings in order to effect approriate intermittent bonding.

While by using the techniques illustrated in the above-identified applications, highly useful products can be prepared for certain end use applications, other attributes of the products are desirable. Among these are increased stretchability and even more pronounced fabric like characteristics with respect to drape and hand.

Regarding stretchability, copending Ostermeier application, Ser. No. 282,684, filed Aug. 22, 1972, describes a manner in which the stretchability of intermittently bonded continuous filament webs can be enhanced. As illustrated therein, an intermittently bonded web such as disclosed in the above-identified Hansen and Pennings application can be stretched in a manner to buckle the filaments between bonded areas. The web can then be heated to set the filaments in their buckled configuration and thereby provide stretch in the fabric.

Regarding techniques for further enhancing the fabric like characteristics of intermittently bonded continuous filament webs, it has been noted that working of the so-bonded webs, such as occurs in normal use, tends to enhance their softness and drape though, at times, with an accompanying loss in strength characteristics. Also, while not specifically directed to intermittently bonded continuous filament webs, U.S. Pat. No. 3,542,634 to Such et al. appears to suggest the preparation of soft apertured and differentially embossed nonwoven fabrics.

The method of Such et al. is described as follows in the patent: "We (Such et al.) have found that novel and useful results may be realized by process deformable material between a pair of rolls which are both engraved in a pattern of land and grooves, as explained more fully below. Such a roll system we have found to have novel advantages in the rearrangement of fibers contained in deformable textile sheet material, including the printing in relief of a displacement pattern simultaneously on both faces of the sheet, spot bonding of sheets containing pressure sensitive or thermoplastic material, and to be particularly suitable for spot-aperturing of both woven and nonwoven fabrics."

It is a principal object of the present invention to provide a novel nonwoven fabric having a very desirable combination of strength and textile like characteristics.

A further object resides in providing an intermittently bonded nonwoven web having the characteristics recited in the principal object in combination with a desirable degree of stretchability.

A still further object resides in providing an intermittently bonded nonwoven web which contains apertures through the thickness thereof and which, as a result, is exceptionally soft and drapable.

Yet another object is to provide a simple and inexpensive method for preparing a nonwoven web having the above-identified attributes. And, related to this object, is the further object of providing a method for providing an intermittently bonded, apertured nonwoven web which does not necessitate the use of high temperature and pressure apparatus.

Other objects and advantages of the present invention will become apparent as the following detailed description proceeds.

In brief, webs having the attributes identified in the objects previously presented contain randomly arranged, molecularly oriented thermoplastic fibers and have a plurality of intermittent perforations or apertures extending through the thickness thereof. Bonding of the fibers to provide web strength occurs at the areas of the web which are immediately adjacent to and define the perforations and involves only surface fusion of the fibers. Thus, the molecular orientation of the fibers entering into and within the bond regions is not substantially diminished and, in turn, the so-bonded webs possess desirable strength.

As illustrated herein, webs having the above-identified characteristics can be prepared by ultrasonically induced fusion of a web of unbonded, molecularly oriented thermoplastic fibers at intermittent regions and in a manner such that the intensity of fusion in the individual intermittent regions diminishes from the center of the regions to their edges. By subsequently stretching the web, those areas of the regions which are most intensively fused break apart to form the desired perforations. The following example is illustrative of such a method.

A nonwoven web of substantially continuous and randomly deposited, molecularly oriented filaments of polypropylene was prepared in accordance with the procedures described in the above-mentioned Dorschner et al. U.S. Pat. No. 3,692,618. The so prepared web had the following characteristics:

| | | |
|---|---|---|
| Basis weight | = | 2.5 oz./yd.² |
| Width | = | 10 inches |
| Filament Denier | = | 1.62 |
| Filament Tenacity | = | 3.4 gram/denier |
| Elongation | = | 142% |
| Crystalline Melting Point of Polymer | = | 162° C. |

Web bonding was then accomplished by passing the web at a speed of about 50 ft./min. between a patterned steel roll and an ultrasonic horn under a pressure of 90 lbs. on the roll with the horn vibrating at 20,000 cycles per second. The patterned steel roll was 3.5 in. in diameter, 10 in. wide with milled vertical grooves at +45° and −45° to the axis to yield a square array of raised points having land dimensions of 0.030 inch on a side, a height of about 0.04 inch, and a pattern spacing of 0.040 inch. The ultrasonic bonding unit was supplied by Branson Sonic Power Company and was operated at a power input of 700 watts with the horn being 10 inches wide with a ½ inch length in the direction of web travel, i.e., the MD direction.

After bonding, as above described, the web was then stretched in the direction of passage through the bonder between three driven roll nips with the speed ratio between the second and first being 1.4:1 and that between the third and second being 1.25:1. The web so prepared was observed to have perforations in a pattern similar to that of the pattern steel roll. On microscopic examination the web was seen to have those characteristics above discussed regarding filament fusion in the web areas defining the perforations. The physical properties, measured on a number of web samples prepared as described above, were as follows:

| | M.D. | C.D. |
|---|---|---|
| Tensile Strength* (lbs./in.) | 14–17 | 10–17 |
| Tensile Energy* (in.-lbs.) | 8–8.6 | 7.7–7.9 |
| Mitex No.** | 300–360 | 190–260 |

*Measured in accordance with ASTM D-1117, using 3 × 1 inch samples.
**Measured using standard Mitex stiffness tester. Greater stiffness is associated with higher values.

As is apparent from the values reported above, the web prepared by the illustrated process is strong, has desirable energy absorbing characteristics, and is soft and drapable. In addition, it is quite stretchable in both the M.D. and C.D. directions.

In fully appreciating the manner of web bonding as illustrated above, two important aspects must be considered. The first is that the manner of initial web bonding, involving as it does sonic welding, results in highly precise bonding in preselected intermittent areas. This should be contrasted with heat bonding using, for example, heated rolls with raised elements on their surfaces wherein there is the accompanying likelihood that the web will be exposed to heat in regions other than those precisely corresponding to the raised points. Such heating not only can result in filament bonding and increased web stiffness in regions between raised points, but also can adversely affect molecular orientation and, in turn, filament and web strength. With the illustrated sonic bonding, it is only those web regions which are disposed between the vibrating horn and the raised points on the roll which are heated.

Since it is those regions which are sonically welded which fail on stretching to create perforations and in turn enhance drape, the area of the web containing sonically welded regions shall be selected so as to be large enough to result in enhancement of the web's textile characteristics while not so large as to adversely affect web strength. Webs sonically bonded with welded regions occupying a surface area of between about 5–50% and, preferably, 10–25% are most useful.

A second important aspect of the illustrated bonding procedure is that the intensity of bonding within the individual sonically welded regions be greatest at the center of the regions and progressively diminish toward the edges thereof. Most desirably, the central portion of the bonded regions should be truly melted such that the filaments therein completely lose their individual identity as such. And, this effect should gradually diminish as the extremity of the bonded regions is approached with filaments entering the bond regions at the edges thereof being clearly identifiable as individual filaments though being bonded together by surface fusion. By providing such a graduated bonding intensity, the center portions of the bond regions readily fail to form perforations on stretching which, as stretching is continued, propagate toward the bond edges. And, so long as excessive stretching is not employed, propagation of the perforations ceases near the edges of the bonded regions where filament bonding is not so intense as to have adversely affected the orientation of filaments throughout their thickness. Thus, the filaments bonded at the edges of the perforations can support a strain applied to the web.

As regards the example presented above, the variation in bond intensity achieved within the sonically welded regions is believed to be due to the thermal gradient which exists near the edges of the bonded regions. Since a relatively high basis weight material is being used, heat is effectively dissipated near the edges of the bonded regions and, as a result, total filament fusion is not achieved in these regions. The illustrated method is also believed to be applicable to both higher and lower basis weight webs, e.g., from about 0.5 oz./yd.$^2$ to about 3 oz./yd.$^2$ and, preferably 1.5 oz./yd.$^2$ to 2.5 oz./yd.$^2$.

As should be apparent, the density of the sonically bonded regions is also important in realizing the advantages of the present invention. If the density thereof is too high, structural integrity is lost. A density of about 50 − 3200/in.$^2$ and, preferably, about 50 − 500/in.$^2$ of sonically bonded regions is most useful. Also, filament denier is important since with very fine filaments achieving surface fusion at the edges of the perforations without adversely affecting filament strength can be difficult. For that reason, webs containing filaments having a denier of 0.5 − 10 and, preferably, 1 − 5, are useful in the illustrated process.

With respect to continuous filament webs, it has been noted that filament realignment in the direction of stretching occurs around the perforations formed during the stretching process. And, that such alignment increases with the amount of stretching. In turn, by controlling the amount of stretching, the webs can be fashioned with desired strain characteristics. For example, the web prepared in accordance with the above illustrated example has a cross-direction strain of about 0.57 which means that, after preparation, a given extension in the machine direction will result in a contraction in the cross-direction which is 57% of the extension in the machine direction. However, by initially stretching the web after sonic bonding to a much greater extent, the strain can be increased to 1.20. Similarly, if after sonic bonding, the web is stretched in the cross-direction (the direction opposite to that which the web travels through the bonding nip) strains of between about 0.8 and 1.9 in the machine direction can be achieved.

As will be apparent, the conditions for achieving sonic bonding and the amount of stretching necessary to perforate the web can be widely varied and, for any given web, the appropriate bonding and stretching condition can be established by simple experimentation. Generally, sonic bonding should be effected with a frequency above the audible limit which is about 16000 − 18000 vibrations/sec. and of an intensity such as to achieve appropriate welding in the manner heretofore described. After sonic welding, stretching the web an amount of about 50% is ordinarily sufficient to create the sought after perforations and, of course, can be higher, e.g. up to about 180%, so long as web deterioration does not occur.

While the above illustrated embodiment of the present invention and the accompanying discussion has been with respect to fashioning webs containing substantially continuous filaments, the method illustrated herein is also applicable to webs containing staple length, molecularly oriented thermoplastic fibers prepared in well-known manner such as carding, airlaying, wet forming, or the like. With respect to such webs, the important aspect is that the fiber length be sufficient to span between welded regions so that on bonding a coherent web is obtained. Preferably, the fiber length will be at least about 1 inch. However, the present invention is considered to be especially applicable to nonwoven webs of substantially continuous filaments and, in particular, to webs prepared as illustrated in the above-identified Dorschner et al. U.S. Pat. No. 3,692,618.

As illustrated in this patent, the method of web formation involves extruding a thermoplastic polymer through a multiple number of downwardly directed spinning nozzles, preferably extending in a row or a multiple number of rows. The filaments, as they are spun, are then gathered into a straight row of side-by-side, evenly spaced apart, untwisted bundles, each containing at least about fifteen and preferably from fifty up to one thousand filaments. These filament bundles are simultaneously drawn downwardly at a velocity of at least three thousand meters per minute, and preferably from 3,500 to 8,000 meters per minute in individually surrounding gas columns flowing at supersonic velocity and directed to impinge on a substantially horizontal carrier. The gathering of the filaments into the untwisted bundles and their drawing and directing to impinge on the carrier is preferably effected by passing the bundles to air guns which surround the filaments with a column or jet of air which is directed downwardly at supersonic velocity. The air guns are arranged so as to extend in one or more rows extending across the carrier at right angles to its direction of movement, so that the bundles confined in the gas columns as the same strike the moving carrier extend in a line or row at right angles across the carrier.

With respect to stretching, it will be noted that a two step stretching operation was employed in the illustrated example. Depending on the web and, particularly its uniformity, such a two step stretching procedure can minimize web deterioration during stretching such as excessive tearing at the edges thereof. Also, after stretching the web can be exposed to a mild heat treating step whereby filaments which tend to buckle out of the plane of the web during the stretching are caused to slightly shrink so as not to provide a fuzzy web surface which could be more receptive to becoming fuzzy during use. Of course, any such subsequent heat treating step should not expose the filaments to a temperature where molecular orientation is adversely affected in a manner such that web strength is significantly diminished.

While the invention has been described in connection with certain preferred embodiments, it is to be understood that the invention is not to be limited to those embodiments. On the contrary, all alternatives, modifications and equivalents as can be included within the scope and the spirit of the invention defined in the appended claims are intended to be covered. For example, while webs prepared from polypropylene filaments have been specifically illustrated herein, fibers prepared from other molecularly oriented, thermoplastic polymers such as nylon, polyethylene, polyesters and the like are also useful.

In addition, it should also be appreciated that the method described herein can be used for the preparation of laminates containing as at least one ply thereof a web containing molecularly oriented thermoplastic fibers and wherein a ply attachment is obtained by means of the illustrated sonic bonding technique. Laminates which can be so prepared include continuous filament web/cellulosic wadding laminates, fiber/film laminates, and laminates fashioned from different types of thermoplastic fibers. Also the invention is applicable to webs containing different types of thermoplastic fibers as well as to webs containing blends of thermoplastic and non-thermoplastic fibers.

We claim as our invention:

1. A strong, stretchable web having desirable fabric-like attributes comprising randomly arranged, molecularly oriented thermoplastic fibers, said web having intermittent perforations through the thickness thereof with the fibers located in the web areas immediately surrounding and defining the perforations being autogenously attached to one another by surface fusion to provide web strength and with the fibers in the regions of the web between the perforations being substantially unbonded to one another, said perforations having propagated outwardly from a central, intensely fused portion of a bond region containing progressively diminishing bond intensity in the direction of the edges thereof.

2. The web of claim 1 wherein the fibers are polypropylene.

3. The web of claim 2 wherein the web contains substantially continuous and randomly deposited molecularly oriented filaments.

4. The web of claim 3 having a basis weight of about 0.5–3 oz./yd.$^2$, wherein the filaments thereof have a denier of about 0.5–10, and wherein the perforations thereof are disposed in a density of about 50–3200/in.$^2$ and occupy a surface area of about 5–50%.

5. The web of claim 3 having a basis weight of about 1.5–2.5 oz./yd.$^2$, wherein the filaments thereof have a denier of about 1–5, and wherein the perforations thereof are disposed in a density of about 50–500/in.$^2$ and occupy a surface area of about 10–25%.

6. The strong, stretchable web of claim 1 wherein the web contains substantially continuous and randomly deposited molecularly oriented filaments.

7. The web of claim 6 having a basis weight of about 1.5–2.5 oz./yd.$^2$, wherein the filaments thereof have a denier of about 1–5, and wherein the perforations thereof are disposed in a density of about 50–500/in.$^2$ and occupy a surface area of about 10–25%.

8. The web of claim 7 wherein the filaments are polypropylene.

* * * * *